United States Patent [19]

Yamazaki

[11] 4,067,027
[45] Jan. 3, 1978

[54] BINOCULAR TELESCOPE CONTAINING A CAMERA

[75] Inventor: Shogo Yamazaki, Tokyo, Japan

[73] Assignee: Asia American Industries Ltd., Tokyo, Japan

[21] Appl. No.: 719,160

[22] Filed: Aug. 31, 1976

[51] Int. Cl.² .................. G03B 17/48; G02B 21/00
[52] U.S. Cl. .................................... 354/79; 350/19
[58] Field of Search .................. 354/79; 350/18, 19

[56] References Cited

U.S. PATENT DOCUMENTS

| | | | |
|---|---|---|---|
| 2,882,791 | 4/1959 | Moller et al. | 354/79 X |
| 2,933,026 | 4/1960 | Winzenburg | 354/79 |

Primary Examiner—John Gonzales
Attorney, Agent, or Firm—Cushman, Darby & Cushman

[57] ABSTRACT

Binocular telescope containing a camera which enables photographing object scenes with the same multiplication as that of a binocular telescope.

2 Claims, 10 Drawing Figures

BINOCULAR TELESCOPE CONTAINING A CAMERA

BACKGROUND OF THE INVENTION

1. Field of the Invention

This invention relates to a binocular telescope containing a camera which enables photographing object scenes with the same multiplication as that of a binocular telescope.

2. Description of the Prior Art

Telescopes in the prior art do not permit photographing faraway objects, and cameras with an attached telephotographing lens which can photograph such faraway objects are very heavy, about 300 – 3000 grams including the weight of the camera and telephotolens.

DETAILED SUMMARY OF THE INVENTION

To overcome these drawbacks in the prior art, this invention provides an easy operating binocular telescope containing a camera comprising a central tubular member and a pair of rotary tubular members containing prisms and pivotally rotatable about the central tubular member. Provided at one side of each of the rotary tubular members in protruded manner are respective eyepiece tubular members to which eyepieces are threaded. A finder having a frame line is provided in either one or both of the tubular eyepiece members. Another tubular member is slidably mounted on each one of the object lens tubular members, one portion of the tubular member constituting an arm, said tubular member containing objective lenses rotatably mounted around a photographing lens tubular member. A focus adjusting tubular member provided with a turning knob at one end is threadably mounted on the central tubular member and contains the photographing lens tubular member. A black box of a camera is fixed on an end of a side of the eyepiece lens of the central tubular member.

It is an object of this invention to provide a compact and lightweight binocular telescope provided with a camera.

It is another object of this invention to provide an easy operation binocular telescope.

BRIEF DESCRIPTION OF THE ACCOMPANYING DRAWINGS

DETAILED DESCRIPTION OF THE PREFERRED EMBODIMENT

Figure 1:
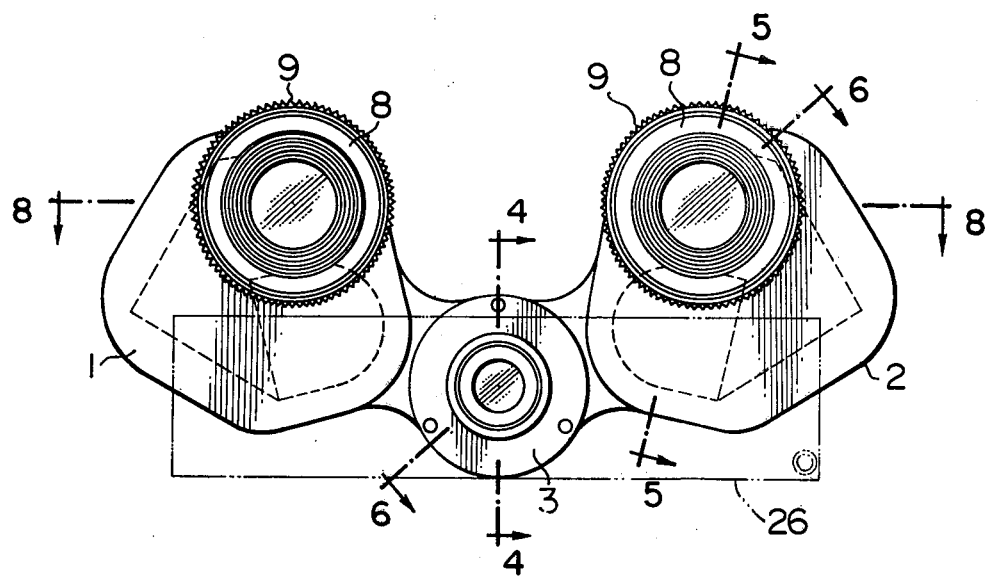
FIG. 1 is a front view of an embodiment according to this invention.
Figure 2:
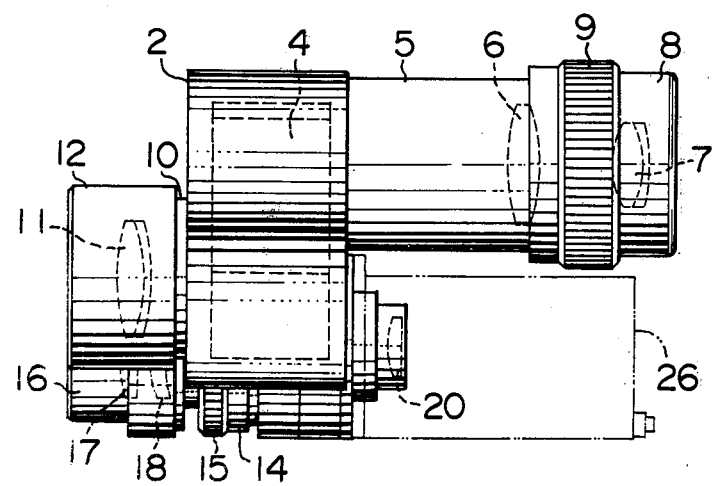
FIG. 2 is a side view.

The preferred embodiment according to this invention will now be discussed with reference to the accompanying drawings.

The drawings show rotary tubular members 1, 2 pivotally mounted to a central tubular element 3. Within the rotary tubular members are prisms 4. Protruding from the rear ends of the rotary tubular members 1, 2 are eyepiece tubular members 5, in which eyepiece lenses 6 and 7 are threadably mounted. Knobs 9 with slits formed on the circumferences of eyepieces 8 are provided to rotate the lenses 6 and 7 by easy fingering.

Figure 5:
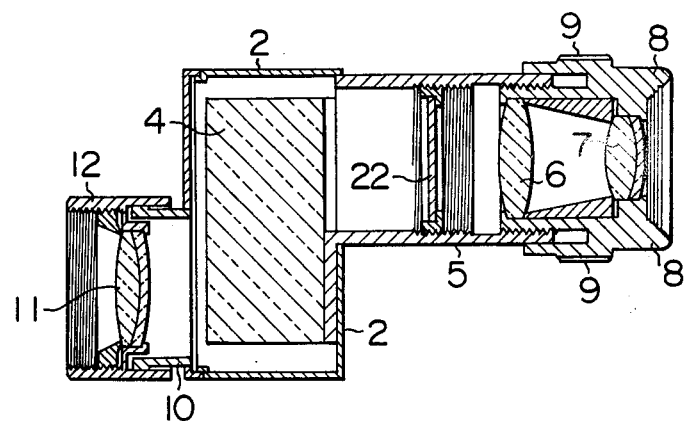
FIG. 5 is a cross sectional view taken along line 5—5 in FIG. 1.

At the opposite ends of rotary tubular members 1, 2 are protruding objective lens-tubular members 10, to which tubular members 12 containing objective lenses 11 (as shown in FIG. 5) are threadably mounted. These tubular members 12 are rotatably mounted around the periphery of a photographing lens tubular member 16 which is threadably mounted to central tubular member 3 by threads 3'. Tubular members 12 are formed in one piece with an arm 13 which itself cannot be moved axially but will so move together with tubular member 16.

A focus adjusting tubular member 14 is threadably mounted in the central tubular member 3 and slits 15 are formed on member 14 for turning same. Mounted in the focus adjusting tubular member 14, photographing lens tubular member 16 contains a plurality of lenses 17, 18, 19, 20 for photographing purposes. The pitch of the threads 3' formed on the engaging portions of the photographing tubular member 16 and the focus adjusting tubular member 14 is larger than the pitch of the threads 14' formed on the engaging portions of the focus adjusting tubular member 14 and central tubular member 3.

Figure 3:
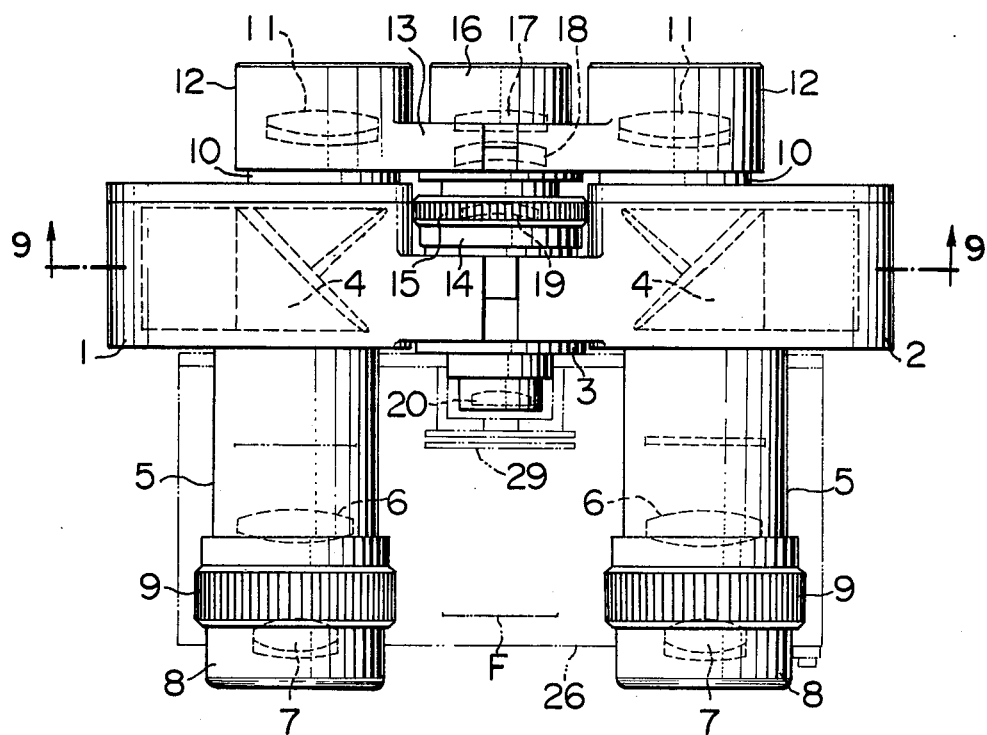
FIG. 3 is a plan view.
Figure 4:
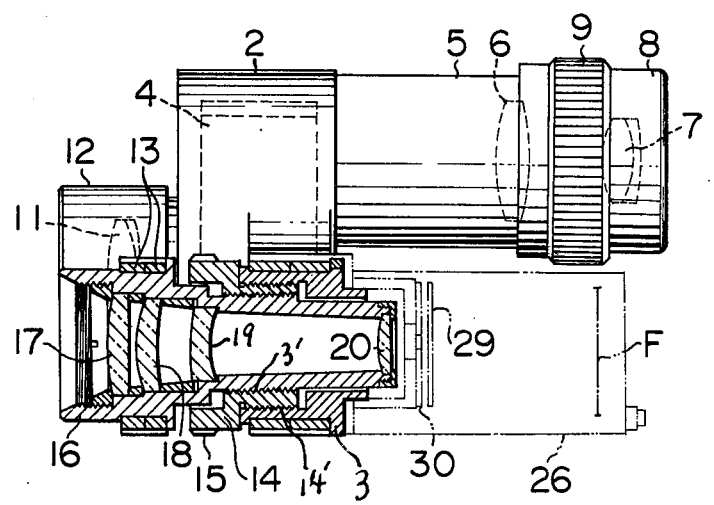
FIG. 4 is a cross sectional view taken along line 4—4 in FIG. 1.
Figure 6:
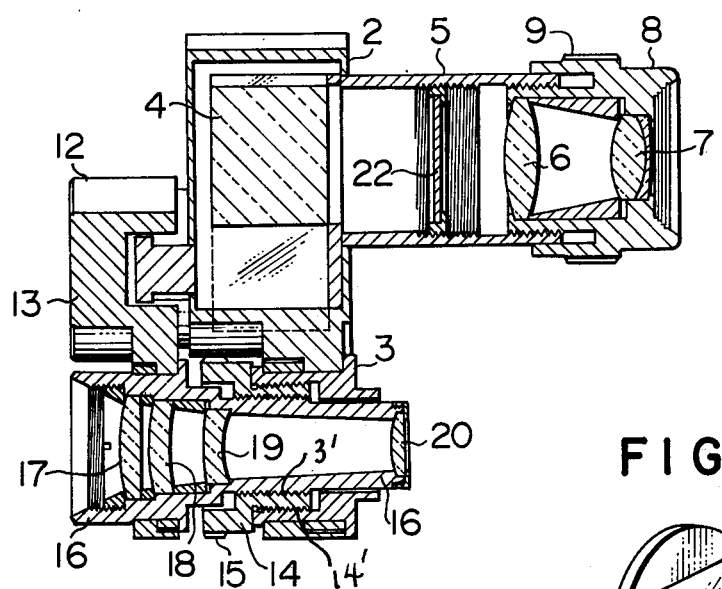
FIG. 6 is a cross sectional view taken along line 6—6 in FIG. 1.
Figure 7:
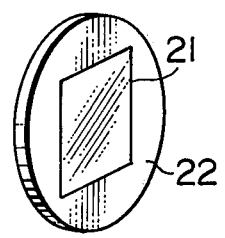
FIG. 7 is a perspective view of the finder.
Figure 8:
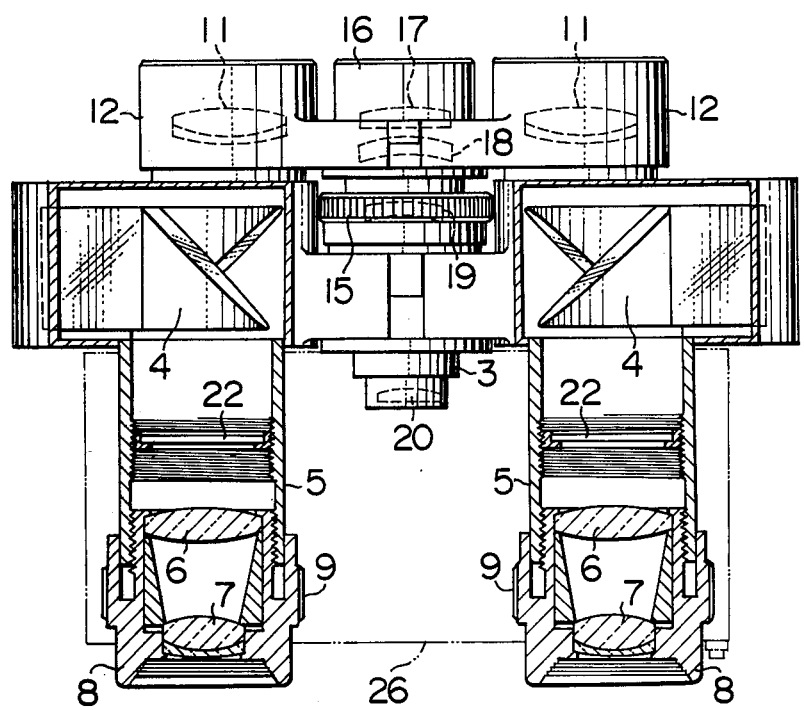
FIG. 8 is a cross sectional view taken along line 8—8 in FIG. 1.
Figure 9:
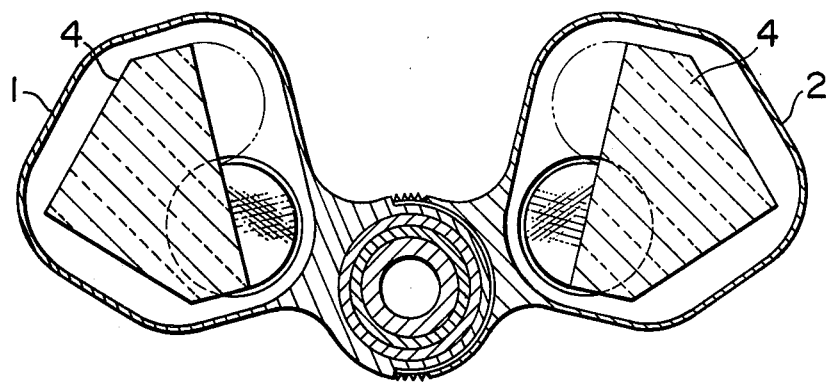
FIG. 9 is a cross sectional view taken along line 9—9 in FIG. 3.
Figure 10:
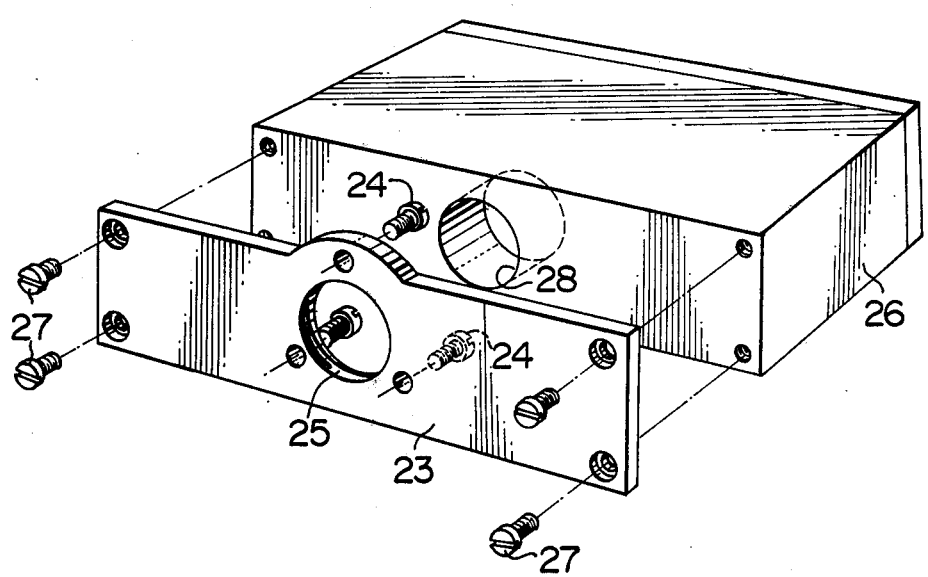
FIG. 10 is a perspective view of a black box of the camera.

A finder 22, shown in enlarged manner in FIG. 7, is provided with a frame line 21 which corresponds to a field of a vision for photographing purposes, and is located (see FIGS. 5, 6 and 8) at a position corresponding to a focus point of the objective lenses 11, within at least one of said eyepiece tubular members 5. A flat, fixing plate 23 shown in FIG. 10 is assembled by screws 24 onto the eyepiece lens side, which is the rear end of central tubular member 3. Fixing plate 23 is provided with a circular hole 25 into which the rear end of central tubular member 3 is threadably mounted, and a black box 26 of the camera is secured by exterior screws 27 to fixing plate 23. Camera box 26 is provided with a circular hole 28 into which the photographing lens tubular member 16 is slidably mounted, and as shown in FIGS. 3 and 4 contains shutter 29 and iris 30.

Operation of the preferred embodiment is now discussed.

First, by manually pivotally turning the rotary tubular members 1, 2 about tubular member 3, the distance between the two eyepieces 8, 8 is adjusted to correspond to that of a user's eyes. Then, focusing on an object is effected by manually rotating knob 15 of the focus adjusting tubular member 14. The resultant distance of (for example) advance of the focus adjusting tubular member 14 is shorter than that of the photographing lens tubular member 16, which is the distance advanced by the objective lens 11. This is caused by the fact that the pitch of threads 3' on the outside of photographing tubular member 16 is larger than that of threads 14' on the outside of focus adjusting tubular member 14. Thus, advance and rearward movements of the objective lenses permit focusing. The user catches the object within the frame line 21 on the finder 22, and then pushes a conventional shutter operating button (not shown) to open shutter 29 for photographing the object.

When the photographing lens tubular member 16 is moved forward and rearward by rotating the focus adjusting knob 15, it is so arranged that the combined focusing positions of the photographing lenses 17-20 are different with respect to the film surface F in camera box 26, and focusing distances of the objective lens 11 and the photographing lens are the same. Thus, focus of the object caught by the eyepiece lens and the focus of the object on the film F are the same. Consequently, photographing of the object corresponding to the object caught in the field of the view of the eyepieces lens can be accomplished. The reasons why the frame line 21 is provided is to pick up the largeness of the image on the film, because an angle of the field of the view varies with the multiplication of the binocular telescope at the photographing time and thus the largeness of the image on the film differs.

As apparent above, the operation of this binocular telescope is not obstructed, and the object which is seen by the eyes of the user is projected within the camera (neither of which is accomplished by the known art) because the photographing lens tubular member 16 is located movably within the central tubular member 3 of the binocular telescope and the camera box 26 is connected to photographing lens tubular member 16.

What is claimed is:

1. A binocular telescope containing a camera comprising:
   a. a central tubular member;
   b. a pair of rotary tubular members, each having first and second faces, respectively, said rotary tubular members being pivotally mounted to be rotatable about said central tubular member;
   c. prism means contained within said rotary tubular members;
   d. a pair of eyepiece tubular members protruding respectively from said first faces of said rotary tubular members;
   e. a pair of eyepieces respectively threadably secured to said eyepiece tubular members;
   f. a finder having a frame line provided in at least one of said eyepiece tubular members;
   g. an objective lens tubular member protruding from said second face of each of said rotary tubular members, a pair of slidable tubular members connected by an arm, each of said slidable tubular members being slidably mounted on a said objective lens tubular member, each said slidable tube member containing an objective lens, said arm having a pivot joint surrounding a photographing lens tubular member;
   h. a focus adjusting tubular member threadably mounted on said central tubular member and provided with a knob at one end thereof and further containing said photographic lens tubular member, said photographic lens tubular member containing photographic lenses; and
   i. a camera body fixed to said central tubular member on the side thereof to receive images from said photographic lenses.

2. A binocular telescope as claimed in claim 1 wherein said photographic lens tubular member has an engaging portion having threads and said focus adjusting tubular member has an engaging portion having threads and said central tubular member has an engaging portion having threads, the pitch of the threads formed on the engaging portion of said photographing lens tubular member being larger than the pitch of the threads formed on the engaging portions of said focus adjusting tubular member and said central tubular member.

* * * * *